United States Patent
Kumbhashi

(10) Patent No.: US 11,341,256 B2
(45) Date of Patent: May 24, 2022

(54) FILE EXPIRATION BASED ON USER METADATA

(71) Applicant: Hewlett Packard Enterprise Development, LP, Houston, TX (US)

(72) Inventor: Vijaya Kumbhashi, Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 607 days.

(21) Appl. No.: 16/256,073

(22) Filed: Jan. 24, 2019

(65) Prior Publication Data

US 2020/0242262 A1    Jul. 30, 2020

(51) Int. Cl.
    *G06F 21/00*      (2013.01)
    *G06F 21/62*      (2013.01)
    *G06F 16/16*      (2019.01)
    *G06F 16/11*      (2019.01)

(52) U.S. Cl.
    CPC ........ *G06F 21/6218* (2013.01); *G06F 16/122* (2019.01); *G06F 16/162* (2019.01)

(58) Field of Classification Search
    CPC ......... G06F 2221/2115; G06F 21/6209; G06F 21/6218; G06F 16/162; G06F 16/122
See application file for complete search history.

(56) References Cited

U.S. PATENT DOCUMENTS

| | | |
|---|---|---|
| 7,680,830 B1 | 3/2010 | Ohr et al. |
| 8,272,028 B2 | 9/2012 | Motoyama |
| 2010/0095349 A1* | 4/2010 | Motoyama ............. H04L 63/10 726/1 |
| 2016/0124974 A1 | 5/2016 | Plumb et al. |
| 2017/0060885 A1 | 3/2017 | Gangadharaiah et al. |

OTHER PUBLICATIONS

Designing Buildings Wiki, "Plan of Action to Achieve GDPR Compliance", available online at <https://www.designingbuildings.co.uk/w/index.php?title=Plan_of_action_to_achieve_GDPR_compliance&oldid=105570>, May 1, 2018, 6 pages.

European Commission, "Data Protection Rules as a Trust-enabler In The Eu and Beyond—Taking Stock", Retrieved on Feb. 17, 2020, 20 pages.

(Continued)

*Primary Examiner* — Tri M Tran
(74) *Attorney, Agent, or Firm* — Trop, Pruner & Hu, P.C.

(57) ABSTRACT

A computing device includes a processor and a machine-readable storage medium storing instructions. The instructions are executable by the processor to: cause a file management sub-system to detect a request to access a particular file belonging to a specific user entity, and to send an authorization request to a security sub-system; cause the security sub-system to check user metadata for the specific user entity in response to the authorization request, to determine whether the file is expired based on the user metadata for the specific user entity, and to, in response to a determination that the file is expired based on the metadata, send a denial of the authorization request to the file management sub-system; and cause the file management sub-system to, in response to the denial, block access to the particular file.

18 Claims, 7 Drawing Sheets

(56) References Cited

OTHER PUBLICATIONS

I-Scoop, "The Right to Erasure or Right to be Forgotten Under The GDPR Explained and Visualize", available online at <https://www.i-scoop.eu/gdpr/right-erasure-right-forgotten-gdpr/>, 2017, 13 pages.
Intersoft Consulting: General Data Protection Regulation (GDPR), "Art. 17 GDPRRight to erasure ('right to be forgotten')", available online at <https://web.archive.org/web/20190123104403/https://gdpr-info.eu/art-17-gdpr/>, Jan. 23, 2019, 2 pages.
Wikipedia, "General Data Protection Regulation", available online at <https://en.wikipedia.org/w/index.php?title=General_Data_Protection_Regulation&oldid=879731048>, Jan. 23, 2019, 21 pages.
Ausloos, "The 'Right to be Forgotten'—Worth Remembering?", Forthcoming Computer Law & Security Review, 2012, pp. 1-17.
Vijfvinkel, "Technology and the Right to be Forgotten", Master's Thesis—Computing Science, Jul. 2016, Radboud University, 68 pages.
Geambasu et al., "Vanish: Increasing Data Privacy with Self-Destructing Data", 18th USENIX Security Symposium, 2009, USENIX Association, 52 pages.
Radia Perlman, "File System Design with Assured Delete," EMC Corporation, Jan. 2006, <https://www.researchgate.net/publication/4240594_File_system_design_witn_assured_delete>.

\* cited by examiner

FILE EXPIRATION BASED ON USER METADATA

BACKGROUND

A file system may include a collection of files organized using a defined structure. For example, a file system may organize files into a hierarchy using directories, folders, and so forth. Some file system may provide search capabilities to allow a user to locate and access a particular file based on specified criteria. Further, some file system may use file properties such as file size, date of creation, date of last modification, and so forth.

BRIEF DESCRIPTION OF THE DRAWINGS

Some implementations are described with respect to the following figures.

DETAILED DESCRIPTION

Some file system may include electronic files with sensitive and/or private information. For example, a medical file system may include health records that include personal medical data (e.g., conditions, prescribed medicines, etc.). In another example, a human resources file system may include records with sensitive employee data (e.g., social security identifier, income, bank account, etc.). In such file systems, it may be desirable to provide expiration of an electronic file based on a date or age associated with the file. Such expiration may include deleting the file, limiting access to the file, and so forth. In some examples, governmental or organizational regulations may require expiration capabilities in file systems. For example, the General Data Protection Regulation 2016/679 ("GDPR") is a European Union regulation that allows individuals to have some control over their personal data, such as the "right to erasure" of such data. However, in some examples, electronic files may be replicated and archived in multiple storage systems that may use different types and/or versions of file management applications. As such, implementing an expiration policy may require coordinating extensive modifications across multiple applications, which can be a complex, time-consuming, and expensive process.

In accordance with some implementations, examples are provided for expiration of electronic files based on user metadata. As described further below with reference to FIGS. 1-6, some implementations may involve an information technology system including a security sub-system and one or more file management sub-systems. The security sub-system may include stored metadata for each user entity (referred to herein as "user metadata"). The user metadata specifies an expiration of one or more files belonging to a specific user entity. When a given file management sub-system detects an access to a particular file owned by a user entity, the file management sub-system sends an authorization request to the security sub-system. The security sub-system checks the metadata for that specific user entity, and determines whether the file is expired. If so, the access is denied, and the file may be optionally deleted or archived. In this manner, some implementations may provide a single expiration mechanism that is usable across multiple file management sub-systems, and that can be implemented with minimal modifications to the file management sub-systems. Accordingly, one or more implementations may reduce the complexity, time, and cost required to provide expiration of electronic files.

Figure 1:
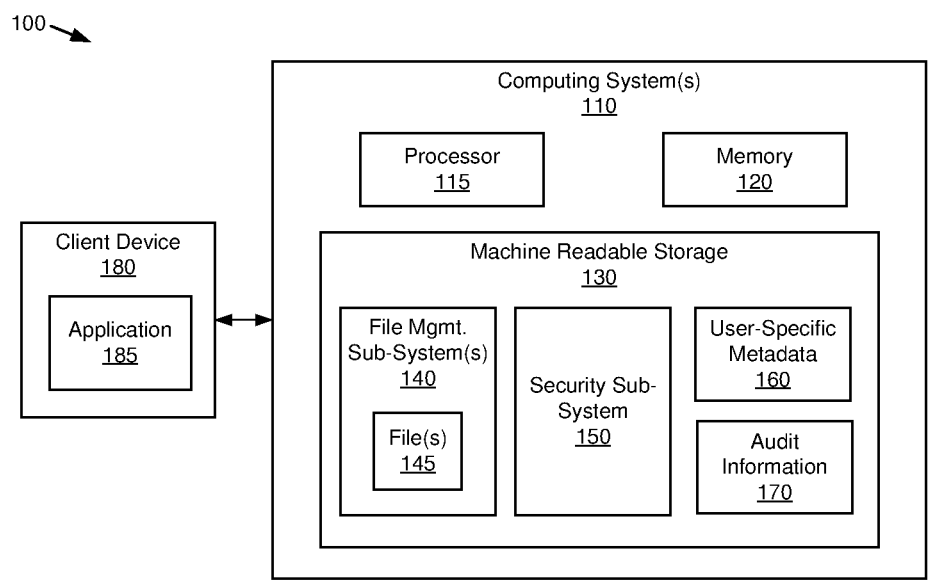
FIG. 1 is a schematic diagram of an example system, in accordance with some implementations.

FIG. 1 shows a schematic diagram of an example information technology (IT) system 100, in accordance with some implementations. As shown, in some implementations, the IT system 100 may include a client device 140 and computing system(s) 110. The computing system(s) 110 may be, for example, one or more of a server, a storage device, a desktop computer, a laptop, and so forth. Further, the computing system(s) 110 may be any grouping of related or interconnected devices, such as a blade server, a computing cluster, and so forth. In some implementations, the IT system 100 may represent the IT infrastructure of a particular company or organization (e.g., an IT support infrastructure, a commercial website, and so forth).

In some implementations, the computing system 110 can interface with the client device 180. For example, the client device 180 may be a terminal or computer that is connected to the computing device via a wired or wireless network. In other examples, the client device 180 may comprise a display screen coupled to (or included in) the computing system 110. In some implementations, an application 185 may be executed by a processor (not shown) of the client device 180. Although not shown in FIG. 1, in some implementations, the client device 180 may a processor, memory, and/or a machine-readable storage.

As shown, the computing system 110 can include a processor 115, memory 120, and machine-readable storage 130. The processor 115 can include one or more of a microprocessor, microcontroller, processor module or subsystem, programmable integrated circuit, programmable gate array, multiple processors, a microprocessor including multiple processing cores, or another control or computing device. The memory 120 can be any type of computer memory (e.g., dynamic random access memory (DRAM), static random-access memory (SRAM), etc.).

In some implementations, the machine-readable storage 130 can include non-transitory storage media such as hard drives, flash storage, optical disks, etc. As shown, the machine-readable storage 130 may include file management sub-system(s) 140, a security sub-system 150, user metadata 160 and audit information 170. The file management sub-system(s) 140 and the security sub-system 150 may be implemented using instructions (e.g. software application(s)) that execute on the processor 115) and associated data. In some implementations, the file management sub-system(s) 140 may include multiple file management sub-systems using different types and/or versions of file management applications.

In some implementations, the file management sub-system(s) 140 may include any number of electronic files 145 that are owned or otherwise associated by various user entities. For example, a user entity may include an individual person, a user role (e.g., "Developer," "Analyst," etc.), or a group (e.g., "IT department," "Audit Team," etc.). The user metadata 160 and/or the audit information 170 may be stored in any type of data structure (e.g., a relational database, an object database, an extensible markup language (XML) database, a flat file, a data warehouse, and so forth).

In some implementations, a particular file management sub-system 140 may receive a request from the application 185 to access a file 145. For example, in some implementations, the application 185 may provide a graphical user interface to allow a user of the client device 180 to perform actions such as reading, writing, copying, moving, and/or deleting the file(s) 145. In some implementations, in response to the received request, the file management sub-system 140 may interact with the security sub-system 150 to determine whether the file 145 is expired based on the user metadata 160. If so, the file management sub-system 140 may deny the request. The expiration functionality of the file management sub-system(s) 140 and the security sub-system 150 is described further below with reference to the example implementations shown in FIGS. 2A-6.

Figure 2A:
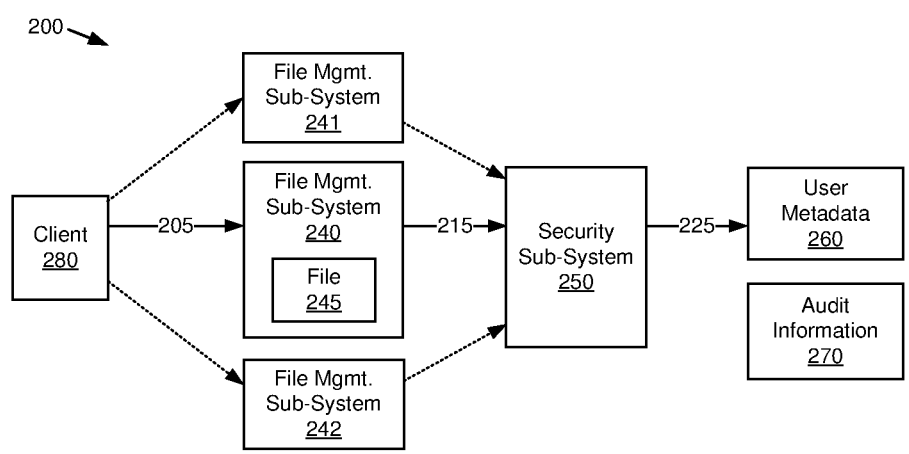
FIGS. 2A-2B are illustrations of example operations in accordance with some implementations.
Figure 2B:
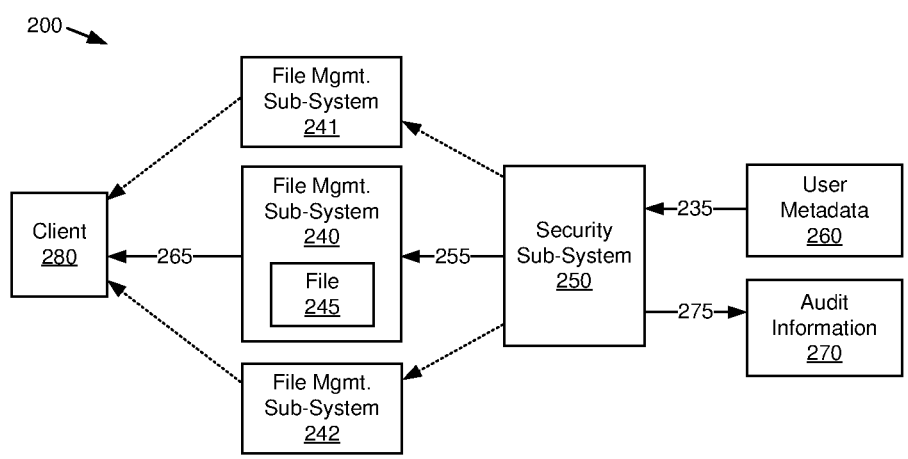

Referring now to FIGS. 2A-2B, shown are illustrations of example operations in accordance with some implementations. Assume that FIG. 2A corresponds to operations in an IT system 200 at a first time period, and that FIG. 2B corresponds to operations in the IT system 200 at a later time period. Assume further that the components of the IT system 200 may correspond generally to similar components of the IT system 100 shown in FIG. 1.

Referring to FIG. 2A, in the first time period, the client 280 may send a request 205 to a particular file management sub-system 240 to access a file 245 (e.g., a request to read, write, copy, move, or delete the file 245). In response to the request 205, the file management sub-system 240 may send an authorization request 215 to the security sub-system 250. Note that the particular file management sub-system 240 may be one of multiple file management sub-systems 240-242. As shown, in some implementations, any of the multiple file management sub-systems 240-242 can receive requests for file access, and can interact with a single security sub-system 250 to determine whether to allow the requests for file access. In some implementations, the multiple file management sub-systems 240-242 may use different file management software, formats, etc. Assume that the file management sub-systems 240-242 and the security sub-system 250 can be implemented in one computing device (e.g., computing system 110 shown in FIG. 1), could be implemented in separate computing devices, or any combination thereof.

In one or more implementations, the security sub-system 250 may identify the user entity that owns the file 245. For example, the security sub-system 250 may read file metadata for the file 245 to identify a particular user that has ownership rights over the file 245. In some implementations, the security sub-system 250 may then send a request 225 to access the user metadata 260 that is specific to the identified user entity. Note that, as used herein, the term "user metadata" refers to metadata that is specific to a particular user entity, and which is separate and distinct from "file metadata" (i.e., metadata that is specific to a particular file).

In one or more implementations, the user metadata 260 may specify expiration information for the user entity associated with the user metadata 260. For example, the user metadata 260 may specify that all files owned by a given user are to expire at a particular date or time (e.g., Dec. 12, 2018), at a particular file age (e.g., when the file 245 is five years old), after a particular period from last access or modification, and so forth. Further, in some examples, the user metadata 260 may specify the expiration date, age, or period for a specific file. In yet another example, the user metadata 260 may specify the expiration date, age, or period for a specific class or group of files (e.g., all files of a given user that are tagged as "personal," that include a particular keyword, that have a particular flag in their file metadata, and so forth). In still another example, the user metadata 260 may specify an expiration rule or policy that is applicable to the user or file. Further, in some implementations, the user metadata 260 may specify a current status for a particular file (e.g., expired or not expired).

Referring now to FIG. 2B, in the second time period (i.e., after the first time period illustrated in FIG. 2A), the security sub-system 250 receives or otherwise accesses expiration information 235 associated with the user metadata 260. For example, the expiration information 235 may be the expiration date, age, or period of the requested file 245 as specified in the user metadata 260 of the user entity that owns the requested file 245. In another example, the expiration information 235 may be a yes/no flag indicating whether the requested file 245 has expired. In still another example, the expiration information 235 may indicate an expiration rule, policy, or status that is applicable to the requested file 245 as specified in the user metadata 260.

In one or more implementations, the security sub-system 250 may use the expiration information 235 to determine whether the requested file 245 has expired, and may send a reply 255 to the file management sub-system 240. If it is determined that the requested file 245 has expired, the reply 255 may cause the file management sub-system 240 to deny or reject the request 205. Further, the file management sub-system 240 may send a notification 265 of the request denial to the client 280. In some implementations, the notification 265 indicating a request denial may also indicate that the denial was caused by the expiration of the requested file 245. However, if it is determined that the requested file 245 has not expired, the reply 255 may cause the file management sub-system 240 to approve and/or execute the request 205. Further, the file management sub-system 240 may send a notification 265 of the request approval to the client 280.

In one or more implementations, upon determining that the file 245 has expired, the security sub-system 250 may perform one or more actions to modify the expired file 245. Further, in some implementations, the performed actions may be specified by a user or administrator in a set of stored policies. For example, the security sub-system 250 may cause the file management sub-system 240 to delete all copies of the file 245. In another example, the security sub-system 250 may cause the file management sub-system 240 to perform a permanent deletion technique over the file 245 (e.g., data shredding or overwriting the storage location including the file 245). In still another example, the security sub-system 250 may cause the file management sub-system 240 to move the file 245 from an original location to an archive system or a secure location that is only accessible to a privileged user or group (e.g., security analysts, archivists, etc.). In yet another example, the security sub-system 250 may change the owner and access permissions (e.g., in file metadata) to a privileged user or group. Note that the above actions are non-limiting examples, and it is contemplated that any number of additional or different actions may be performed for the expired file 245.

In one or more implementations, the security sub-system 250 may provide an update 275 to the audit information 270 regarding the outcome of the request 205. For example, the audit information 270 may be updated to indicate that the request 205 was denied based on the expiration of the requested file 245. In another example, the audit information 270 may be updated to indicate that the request 205 was approved. Further, the audit information 270 may be updated to include other information, such as date/time of the request 205, the user that generated the request 205, the owner of the file 245, whether the file 245 was deleted or archived, and so forth. Note that the security sub-system 250 may perform the above described actions 235, 255, 265, 270 is response to authorization requests from any of the multiple file management sub-systems 240-242.

Note that, while FIGS. 1-2B show example implementations, other implementations are possible. For example, it is contemplated that the client device 140 and/or the computing system 110 may include additional components. In another example, it is contemplated that the file management sub-system(s) 140 and the security sub-system 150 may be implemented in separate computing devices. In yet another example, it is contemplated that the computing system 110 may include multiple file management sub-systems 140 that are implemented in multiple hosts. Other combinations and/or variations are also possible.

Figure 3:
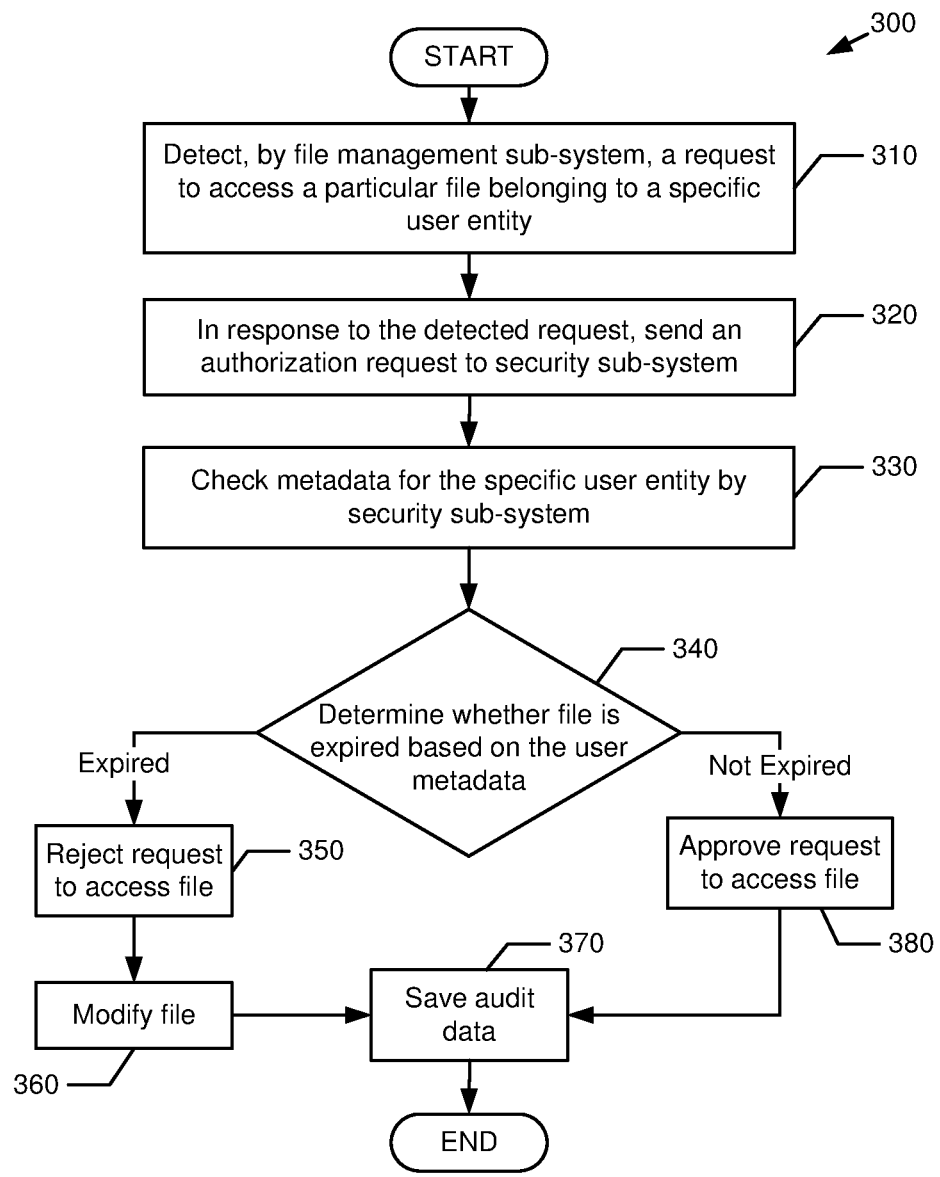
FIG. 3 is a flow diagram of an example process, in accordance with some implementations.

Referring now to FIG. 3, shown is an example process 300, in accordance with some implementations. The process 300 may be performed by the system 100 shown in FIG. 1. The process 300 may be implemented in hardware or machine-readable instructions (e.g., software and/or firmware). The machine-readable instructions are stored in a non-transitory computer readable medium, such as an optical, semiconductor, or magnetic storage device. For the sake of illustration, details of the process 300 may be described below with reference to FIGS. 1-2B, which show examples in accordance with some implementations. However, other implementations are also possible.

Block 310 may include detecting, by file management sub-system, a request to access a particular file belonging to a specific user entity. For example, referring to FIG. 2A, the file management sub-system 240 may detect the request 205 for access to the file 245.

Block 320 may include, in response to the detected request, send an authorization request to security sub-system. For example, referring to FIG. 2A, the file management sub-system 240 sends the authorization request 215 to the security sub-system 250.

Block 330 may include checking metadata for the specific user entity by security sub-system. For example, referring to FIG. 2A, the security sub-system 250 may identify the user entity that owns the file 245, and may send the request 225 to access the user metadata 260 that is specific to the identified user entity.

Diamond 340 may include determining whether the particular file is expired based on the user metadata. For example, referring to FIG. 2B, the security sub-system 250 may determine whether the file 245 is expired based on the user metadata 260 (e.g., via the expiration information 235).

If it is determined at diamond 340 that the particular file is expired, then at block 350, the request to access the file is rejected. Block 360 may include modifying the requested file. Block 370 may include saving audit data related to the rejected request. For example, referring to FIG. 2B, the security sub-system 250 may use the expiration information 235 to determine that the requested file 245 has expired, and send a reply 255 to cause the file management sub-system 240 to reject the request 205. The reply 255 may also cause the file management sub-system 240 to delete or archive the file 245. Further, in some implementations, the security sub-system 250 may update the audit information 270 to indicate that the request 205 was denied based on the expiration of the requested file 245.

However, if it is determined at diamond 340 that the particular file is not expired, then at block 380, the request to access the file is approved. Block 370 may include saving audit data related to the approved request. For example, referring to FIG. 2B, the security sub-system 250 may send the reply 255 to cause the file management sub-system 240 to approve and/or execute the request 205. Further, in some implementations, the security sub-system 250 may update the audit information 270 to indicate that the request 205 was approved and/or executed. After block 370, the process 300 is completed.

Figure 4:
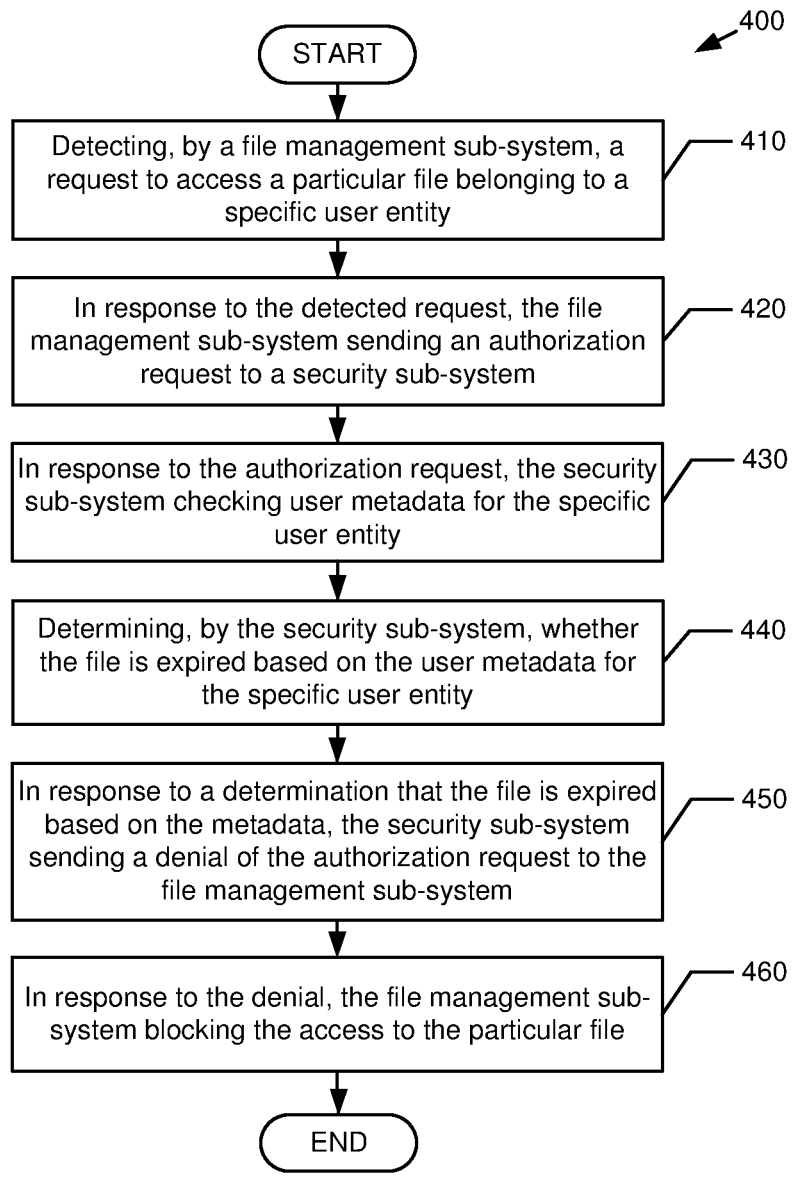
FIG. 4 is a flow diagram of an example process for file management, in accordance with some implementations.

Referring now to FIG. 4, shown is an example process 400 for file management, in accordance with some implementations. The process 400 may be performed by the system 100 shown in FIG. 1. The process 400 may be implemented in hardware or machine-readable instructions (e.g., software and/or firmware). The machine-readable instructions are stored in a non-transitory computer readable medium, such as an optical, semiconductor, or magnetic storage device. For the sake of illustration, details of the process 400 may be described below with reference to FIGS. 1-2B, which show examples in accordance with some implementations. However, other implementations are also possible.

Block 410 may include detecting, by file management sub-system, a request to access a particular file belonging to a specific user entity. For example, referring to FIG. 2A, the file management sub-system 240 may detect the request 205 for access to the file 245.

Block 420 may include, in response to the detected request, the file management sub-system sending an authorization request to a security sub-system. For example, referring to FIG. 2A, the file management sub-system 240 sends the authorization request 215 to the security sub-system 250.

Block 430 may include, in response to the authorization request, the security sub-system checking user metadata for the specific user entity. For example, referring to FIG. 2A, the security sub-system 250 may identify the user entity that owns the file 245, and may send the request 225 to access the user metadata 260 that is specific to the identified user entity.

Block 440 may include determining, by the security sub-system, whether the file is expired based on the user metadata for the specific user entity. For example, referring to FIG. 2B, the security sub-system 250 may determine whether the file 245 is expired based on the user metadata 260.

Block 450 may include, in response to a determination that the file is expired based on the metadata, the security sub-system sending a denial of the authorization request to the file management sub-system. Block 460 may include, in response to the denial, the file management sub-system blocking the access to the particular file. For example, referring to FIG. 2B, the security sub-system 250 may use the expiration information 235 to determine that the requested file 245 has expired, and may send a reply 255 indicating a request denial to the file management sub-system 240. In response to the reply 255, the file management sub-system 240 may block the client 280 from accessing the requested file 245. After block 460, the process 400 is completed.

Figure 5:
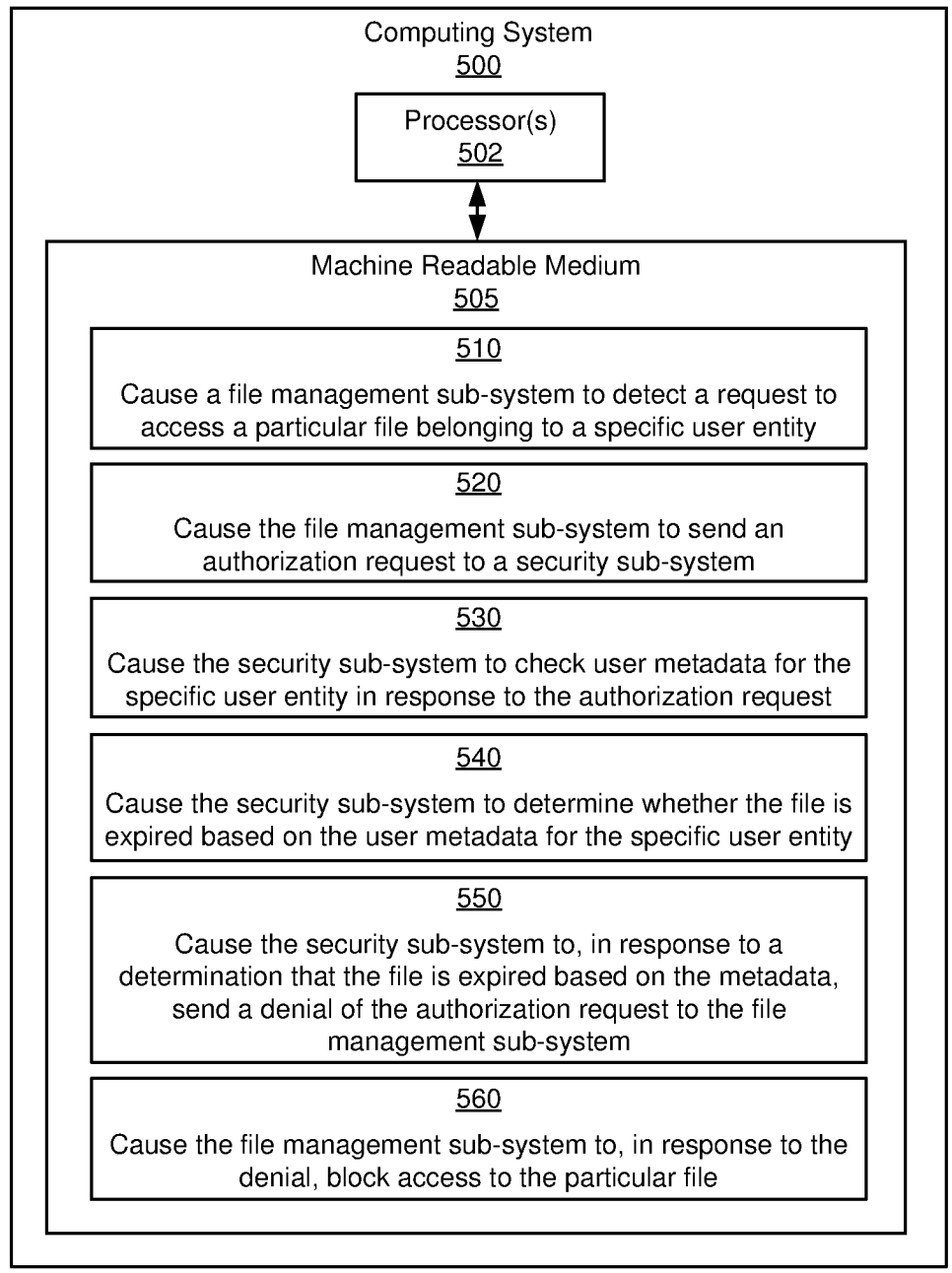
FIG. 5 is a schematic diagram of an example computing device, in accordance with some implementations.

Referring now to FIG. 5, shown is a schematic diagram of an example computing device 500. In some examples, the computing device 500 may correspond generally to the computing system 110 shown in FIG. 1. As shown, the computing device 500 may include a hardware processor(s) 502 and machine-readable storage medium 505. The machine-readable storage medium 505 may be a non-transitory medium, and may store instructions 510-560. The instructions 510-560 can be executed by the hardware processor(s) 502.

Instruction 510 may be executed to cause a file management sub-system to detect a request to access a particular file belonging to a specific user entity. Instruction 520 may be executed to cause the file management sub-system to send an authorization request to a security sub-system. Instruction 530 may be executed to cause the security sub-system to check user metadata for the specific user entity in response to the authorization request.

Instruction 540 may be executed to cause the security sub-system to determine whether the file is expired based on the user metadata for the specific user entity. Instruction 550 may be executed to cause the security sub-system to, in response to a determination that the file is expired based on the metadata, send a denial of the authorization request to the file management sub-system. Instruction 560 may be executed to cause the file management sub-system to, in response to the denial, block access to the particular file.

Figure 6:
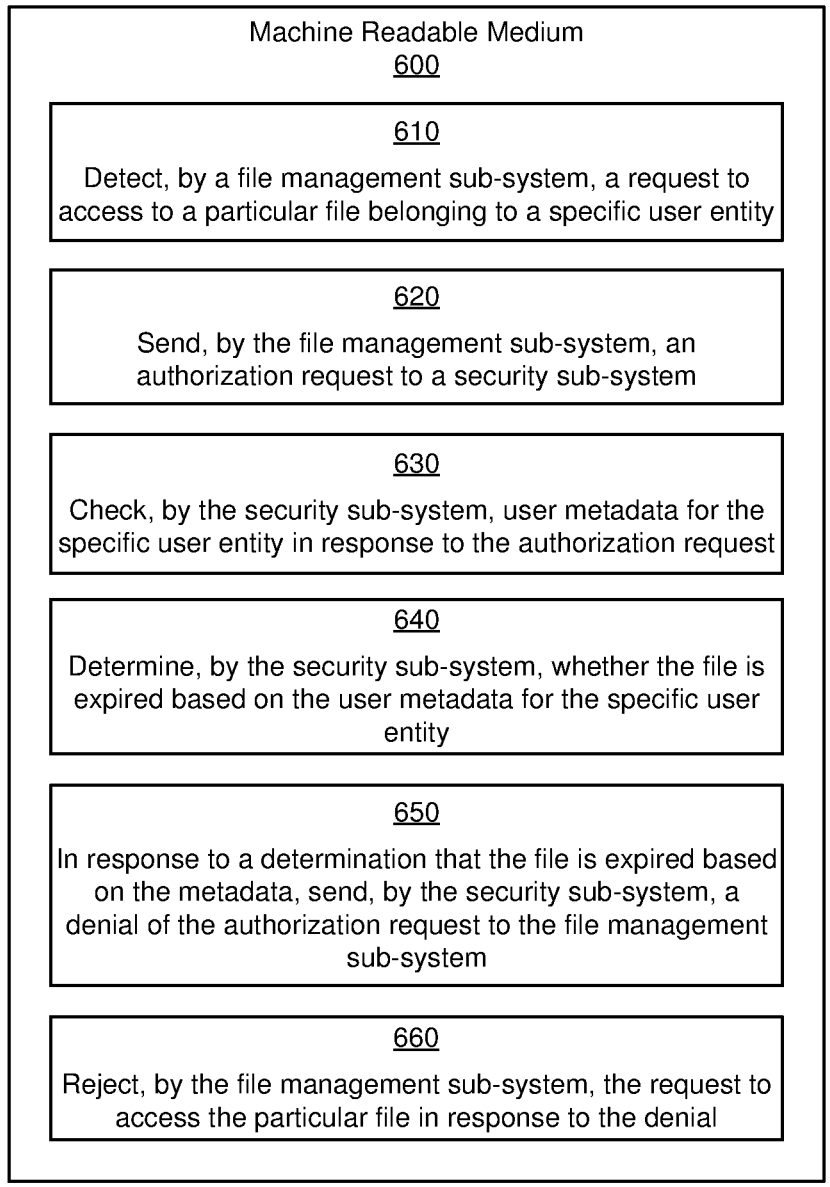
FIG. 6 is a diagram of an example machine-readable storage medium storing instructions in accordance with some implementations.

Referring now to FIG. 6, shown is a machine-readable storage medium 600 storing instructions 610-660, in accordance with some implementations. The instructions 610-660 can be executed by any number of processors (e.g., the processor 115 shown in FIG. 1). The machine-readable storage medium 600 may be any non-transitory computer readable medium, such as an optical, semiconductor, or magnetic storage device.

Instruction 610 may detect, by a file management sub-system, a request to access to a particular file belonging to a specific user entity. Instruction 620 may send, by the file management sub-system, an authorization request to a security sub-system. Instruction 630 may check, by the security sub-system, user metadata for the specific user entity in response to the authorization request.

Instruction 640 may determine, by the security sub-system, whether the file is expired based on the user metadata for the specific user entity. Instruction 650 may, in response to a determination that the file is expired based on the metadata, send, by the security sub-system, a denial of the authorization request to the file management sub-system. Instruction 660 may reject, by the file management sub-system, the request to access the particular file in response to the denial.

In accordance with some implementations, examples are provided for expiration of electronic files based on user metadata. Some implementations may include a security sub-system and one or more file management sub-systems. A file management sub-system may detect a request to access a particular file, and may send an authorization request to the security sub-system. The security sub-system checks the user metadata to determine whether the file is expired. If so, the access is denied, and the file may be optionally deleted or archived. In this manner, some implementations may provide a single expiration mechanism that is usable across multiple file management sub-systems, and that can be implemented with minimal modifications to the file management sub-systems. Accordingly, one or more implementations may provide improved expiration of electronic files.

Data and instructions are stored in respective storage devices, which are implemented as one or multiple computer-readable or machine-readable storage media. The storage media include different forms of non-transitory memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices.

Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A computing system comprising:
a hardware processor; and
a machine-readable storage medium storing instructions, the instructions executable by the hardware processor to:
cause a file management sub-system to detect a request to access a particular file belonging to a specific user entity, and to send an authorization request to a security sub-system;
cause the security sub-system to check user metadata for the specific user entity in response to the authorization request, to determine whether the file is expired based on the user metadata for the specific user entity, and to, in response to a determination that the file is expired based on the metadata, send a denial of the authorization request to the file management sub-system; and
cause the file management sub-system to, in response to the denial, block access to the particular file,
wherein the file management sub-system is one of a plurality of file management sub-systems that send authorization requests to the security sub-system, and wherein the plurality of file management sub-systems use different file management software.

2. The computing system of claim 1, comprising instructions to:
cause the security sub-system to update audit information to indicate that the request was blocked due to an expiration of the particular file.

3. The computing system of claim 1, comprising instructions to:
cause the file management sub-system to, in response to the denial, delete all copies of the particular file.

4. The computing system of claim 1, comprising instructions to:
cause the file management sub-system to, in response to the denial, move the particular file to a secure location that is only accessible to a privileged user entity.

5. The computing system of claim 1, comprising instructions to:
cause the file management sub-system to, in response to the denial, change the ownership and access permission of the particular file to a privileged user entity.

6. The computing system of claim 1, wherein the user metadata is uniquely associated with the specific user entity, wherein the user metadata specifies an expiration age period for files belonging to the specific user entity.

7. A non-transitory machine-readable storage medium storing instructions that upon execution cause a processor to:
detect, by a file management sub-system, a request to access to a particular file belonging to a specific user entity;
send, by the file management sub-system, an authorization request to a security sub-system;
check, by the security sub-system, user metadata for the specific user entity in response to the authorization request;
determine, by the security sub-system, whether the file is expired based on the user metadata for the specific user entity;
in response to a determination that the file is expired based on the metadata, send, by the security sub-system, a denial of the authorization request to the file management sub-system; and
reject, by the file management sub-system, the request to access the particular file in response to the denial,
wherein the file management sub-system is one of a plurality of file management sub-systems that send authorization requests to the security sub-system, and wherein the plurality of file management sub-systems use different file management software.

8. The non-transitory machine-readable storage medium of claim 7, wherein the instructions further cause the processor to:
update audit information to indicate that the request was blocked due to an expiration of the particular file.

9. The non-transitory machine-readable storage medium of claim 7, wherein the user metadata is uniquely associated with the specific user entity, wherein the user metadata specifies an expiration date for files belonging to the specific user entity.

10. The non-transitory machine-readable storage medium of claim 7, wherein the instructions further cause the processor to:
in response to the denial, delete all copies of the particular file.

11. The non-transitory machine-readable storage medium of claim 7, wherein the instructions further cause the processor to:
in response to a determination that the file is not expired based on the metadata, send, by the security sub-system, an approval of the authorization request to the file management sub-system; and
execute, by the file management sub-system, the request to access the particular file in response to the approval of the authorization request.

12. The non-transitory machine-readable storage medium of claim 7, wherein the instructions further cause the processor to:
in response to the denial, archive the particular file.

13. The non-transitory machine-readable storage medium of claim 7, wherein the instructions further cause the processor to:
in response to the denial, change the ownership and access permission of the particular file to a privileged user entity.

14. A method for file management, comprising:
detecting, by file management sub-system, a request to access a particular file belonging to a specific user entity;
in response to the detected request, the file management sub-system sending an authorization request to a security sub-system;
in response to the authorization request, the security sub-system checking user metadata for the specific user entity;
determining, by the security sub-system, whether the file is expired based on the user metadata for the specific user entity;
in response to a determination that the file is expired based on the metadata, the security sub-system sending a denial of the authorization request to the file management sub-system; and
in response to the denial, the file management sub-system blocking the access to the particular file,
wherein the file management sub-system is one of a plurality of file management sub-systems that send authorization requests to the security sub-system, and wherein the plurality of file management sub-systems use different file management software.

15. The method of claim 14, wherein the user metadata is uniquely associated with the specific user entity, wherein the user metadata specifies an expiration age period for files belonging to the specific user entity.

16. The method of claim 14, further comprising:
updating, by the security sub-system, audit information to indicate that the request was blocked due to an expiration of the particular file.

17. The method of claim 14, further comprising, in response to the denial:
moving, by the file management sub-system, the particular file to a secure location that is only accessible to a privileged user entity.

18. The method of claim 14, further comprising, in response to the denial:
deleting, by the file management sub-system, all copies of the particular file.

* * * * *